Patented Feb. 24, 1931

1,794,231

UNITED STATES PATENT OFFICE

HERBERT ALFRED HUMPHREY, OF STOCKTON-ON-TEES, ENGLAND, ASSIGNOR TO ATMOSPHERIC NITROGEN CORPORATION, OF SOLVAY, NEW YORK, A CORPORATION OF NEW YORK

PRODUCTION OF MIXTURES OF NITROGEN AND HYDROGEN FOR AMMONIA SYNTHESIS

No Drawing. Application filed September 24, 1925, Serial No. 58,439, and in Great Britain September 24, 1924.

This invention relates to an improved continuous process for the manufacture of mixtures of introgen and hydrogen and to the art of ammonia synthesis therefrom.

One of the main objects of the invention is to provide an improved process of making such nitrogen-hydrogen mixtures from steam and carbonaceous fuel in a practically continuous manner. Another object is to allow the process of ammonia synthesis to be performed with such gases with the minimum of loss caused by inert gases such as methane; further objects will be apparent from the following description of the invention. The scope of the invention will be defined in the appended claims.

It is known to make such mixtures by starting with water gas, producer gas or the like, and then adding suitable quantities of steam and causing the reaction between carbon monoxide and steam to give carbon dioxide and hydrogen. But such gaseous mixtures, even after the purifying processes adapted to remove water vapour, carbon monoxide and carbon dioxide, still contain appreciable quantities of methane (perhaps 1 to 3%) and the presence of this inert constituent is undesirable since work has to be expended in pumping this gas while no useful result can be obtained from it and its presence lowers the efficiency of the reaction between nitrogen and hydrogen. The presence of inert constituents is especially undesirable in processes in which the nitrogen-hydrogen mixture is circulated over the catalyst i. e. in which gas not synthesized in its passage over the catalyst is again passed over the same catalyst. For when the ammonia that has been synthesized is removed from the gaseous mixture and fresh nitrogen-hydrogen mixture is added to take its place the proportion of inert constituents in the gases increases, and this accumulation cannot be prevented. Finally when the proportion of inert constituents in the irculating mixture becomes so great that it is appreciably affecting the net make of ammonia it is necessary to purge away part of the gases. In this way the concentration of inert constituents may be kept down to a reasonable figure, but at the same time the periodic purge results in the loss of valuable nitrogen-hydrogen mixture, for it would be expensive to separate the methane from the valuable gases.

According to my invention, however, it is possible starting from carbonaceous fuel to prepare a nitrogen-hydrogen mixture which contains little or no methane, and consequently the above mentioned difficulties are avoided. In the preferred form of my process I use as a raw material for the preparation of the nitrogen-hydrogen mixture the combustible gas manufactured by the process in my co-pending application No. 58,440, filed September 24, 1925. In that process a combustible gas is obtained from pulverized fuel by burning same while suspended in a mixture of highly preheated air and steam at a very high temperature, such as 1300° C. and under such conditions I have found that the resultant gas mixture contains practically no methane or other inert hydrocarbons. Or I may also use combustible gas manufactured from fuel in lump form provided that the temperature in or after the combustion chamber is maintained at the unusual temperature of or about 1300° C.

It is true that in an ordinary producer the gases pass through a hot zone the temperature of which may attain 1300° C. but this hot zone is small relative to the whole combustion chamber and the passage therethrough of the gases is never of sufficient duration completely to crack any hydrocarbons produced previously. Moreover after passing through the very hot zone in an ordinary producer the gases have still to traverse colder layers of fuel and here fresh quantities of hydrocarbons are produced by the action of the heat of the gases upon the fuel. In my process however, the whole of the combustion chamber is continuously at substantially the same very high temperature and there are no colder layers of fuel through which the gas has to pass. Consequently the hydrocarbons are completely or almost completely cracked and the resultant gas is obtained free from these undesirable compounds. Thus if lump fuel is used it should be fed into the producer at the necessary high temperature by preheating it and feeding it on top of the fuel bed, or if cold fuel is used it should be supplied on the underfeed principle, i. e. below the hot fuel.

The gaseous mixture of nitrogen, carbon monoxide and hydrogen so produced is accordingly particularly suitable for the manufacture of a nitrogen-hydrogen mixture for ammonia synthesis. The procedure is according to known methods, for example as follows:

Steam is added to the gaseous mixture of nitrogen, carbon monoxide and hydrogen (which may already contain some steam) and the mixture is passed over a contact mass consisting of or containing iron oxide or the like. If the reaction is carried out in the presence of a suitable excess of steam and at a temperature in the neighborhood of 500° C. a substantial conversion of carbon monoxide is obtained, according to the equation:

$$CO + H_2O = CO_2 + H_2$$

Carbon dioxide, excess steam and residual carbon monoxide are then removed by known processes, and the residual gases consist of nitrogen and hydrogen with practically no inert hydrocarbons. Before the synthesis step the proportions of nitrogen and hydrogen in the mixture may be adjusted to the stoichiometric ratio of 1:3 by addition of extra hydrogen or this step may be carried out by addition of water gas to the nitrogen-hydrogen carbon monoxide mixture before catalysis, in such amounts that the ratio of the volume of nitrogen to the sum of the volumes of carbon monoxide and hydrogen in the mixture is 1:3. I may use air enriched with oxygen and if proper amounts of oxygen are used in the manufacture of the combustible gas the correct ratio of 1:3 may be attained directly and no addition of hydrogen to the mixture need be made.

It will be seen that in my process the high temperature is maintained continuously, preferably by using pulverized fuel with high preheat of the gases. When using lump fuel, I use the term high temperature to refer to a temperature which is maintained continuously in such manner as to avoid the undesirable results mentioned above and I do not refer to the temperature which may exist at one zone only of a producer worked continuously or to the temperatures which may exist at the initial part of the "run" stage of a producer worked intermittently.

I prefer to return to the combustion chamber a large proportion of the available heat of the gaseous products of combustion in the form of preheat in the entering gases.

I declare that what I claim is:

1. In the process of manufacturing synthetic ammonia which comprises burning solid carbonaceous fuel in the presence of steam, subjecting the gaseous products containing CO to catalytic action to cause said CO to react with $H_2O$ to form a volume of hydrogen substantially equal to that of said CO, establishing a proportion of three to one between hydrogen and nitrogen in the gas mixture, removing compounds of oxygen from the gas mixture, catalyzing the gas mixture to synthesize a part thereof to ammonia, separating the ammonia formed, and returning the unconverted gas to the ammonia catalyst through a closed periodically bled circulatory system, that improvement which consists in highly preheating the air and steam used with the solid carbonaceous fuel in the first step, maintaining a temperature of approximately 1300° C. in the gasification zone, and withdrawing the resultant gaseous products from the burning solid fuel and causing heat contained in said products to be transferred to entering air and steam, while preventing the said gaseous products from contacting with colder solid fuel whereby a substantially methane-free gas is produced so that in the last circulatory step of the ammonia process the methane-free condition of the circulating gas mixture will obviate the necessity of bleeding out accumulating methane and thus greatly lengthen the periods between the bleedings required for rare gases contained in the circulating gas mixture.

2. The process as set forth in claim 1 in which the solid carbonaceous fuel burned in the presence of steam at a temperature of approximately 1300° C. is burned while suspended in an air-steam mixture in the form of finely divided particles.

In witness whereof, I have hereunto signed my name.

HERBERT ALFRED HUMPHREY.